July 4, 1950 O. T. McILVAINE 2,514,081
PHONOGRAPH PICKUP DEVICE
Filed Aug. 8, 1946
Fig. 1.
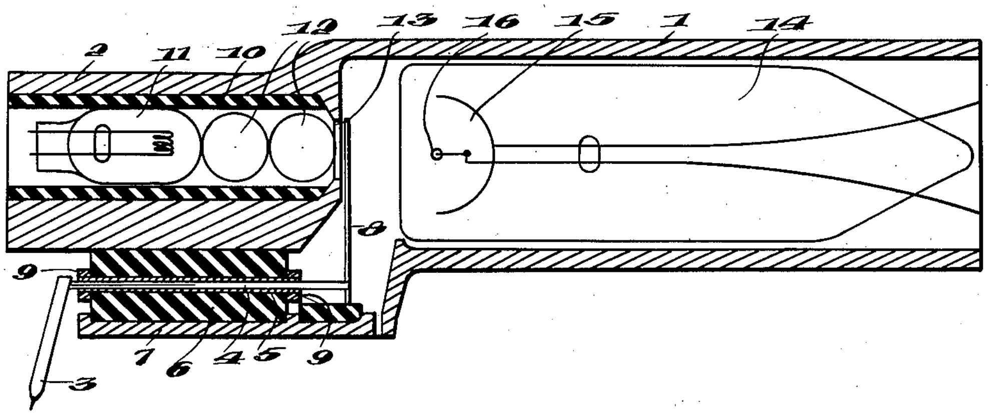
Fig. 2.
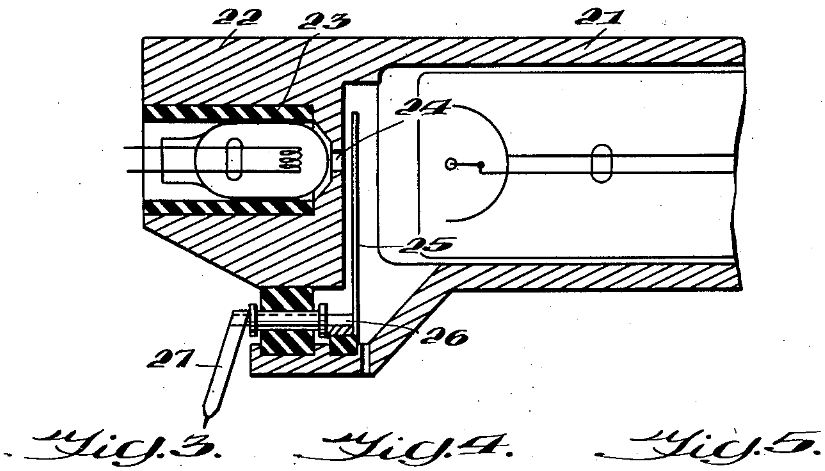
Fig. 3. Fig. 4. Fig. 5.
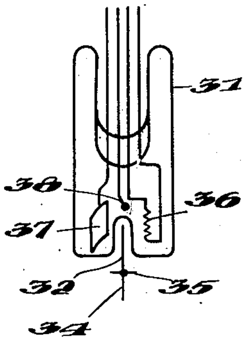
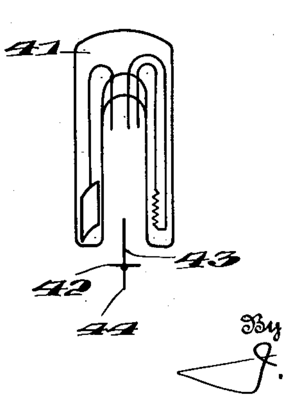
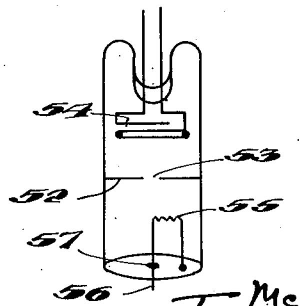
Inventor
Oran T. McIlvaine
By J. Preston Swecker his Attorney Patented July 4, 1950

2,514,081

UNITED STATES PATENT OFFICE 2,514,081

PHONOGRAPH PICKUP DEVICE

Oran T. McIlvaine, St. Charles, Ill.

Application August 8, 1946, Serial No. 689,105

6 Claims. (Cl. 179—100.41)

This invention relates to improvements in phonograph pick-up devices, and particularly such devices that operate photo-electrically.

It has been proposed heretofore to use a photoelectric sound pick-up device for phonographs, but for the most part this has required a small hole or slot having a vane movable thereover to control the amount of light through the hole or slot or to vary the light. Such an arrangement is difficult to adjust because it is necessary that the vane and needle or stylus be lined up accurately with the hole or slot. Even a very slight irregularity on the playing disc will shift the stylus sufficiently so as to vary the vane out of range to discontinue the reproduction. Such a construction renders the device unsatisfactory and expensive to build, because of the accuracy required.

The object of this invention is to improve the construction of such phonograph pick-up devices, to reduce the difficulties encountered in construction, to eliminate the necessity for accurate alignment of the stylus with the slot or hole, and to improve the tone quality as compared with pick-up devices employed heretofore.

This is accomplished, according to the preferred embodiments of the invention, by connecting a vane with the stylus to operate in response thereto, with the vane disposed in the path of the light beam to the light responsive device, whereby it will control the operation of the phonograph reproducing device, according to the variations of the stylus acting in response to the sound groove in the record disc, but without the necessity for accurate alignment between a light opening or slot and the vane. This reduces the cost of the construction because of the elimination of the aperture and, furthermore, it is not critical of adjustment since the vane will function satisfactorily over a wide range.

The source of light and the light responsive device may be mounted on the free end of the tone arm, if desired, which also carries the stylus and vane with the latter in position to be moved into the path of light between the light source and the beam in response to variations in the stylus, as it follows the sound groove in the record disc. This materially simplifies the construction and renders it practical for commercial use.

These embodiments of the invention are illustrated in the accompanying drawings, in which:

Fig. 1 is a partial sectional view, with parts shown diagrammatically, illustrating one form of the invention applied to the free end of a tone arm;

Fig. 2 is a similar view showing a modified form thereof; and

Figs. 3, 4 and 5 are diagrammatic views showing needle controlled light valves associated with lamps.

The invention is adapted for use in connection with phonograph apparatus of any suitable or well-known form in which a record disc is usually mounted on a rotary turntable, over which the pick-up unit is supported by a tone arm that extends laterally over the record disc and is pivotally supported at its opposite end. This structure, being conventional, is not illustrated, but it will be understood that the invention is not limited in its application to this type of phonograph apparatus, and it may be used with different forms thereof, wherever it may be desired.

The tone arm is shown in the drawing, being designated generally by the numeral 1, being adapted for pivotal support at one end thereof, while the opposite end designated 2 is preferably weighted or constructed of relatively heavy material to provide for the necessary and desired differential in weight between the arm and the stylus.

The stylus or needle is designated generally at 3, preferably being constructed as a sapphire stylus of the character ordinarily used in sound reproducing apparatus. This stylus 3 is mounted on one end of a shaft 4 which is comparatively small in cross section and may be, in fact, a torque wire that is supported by the end portion 2 of the tone arm. The shaft 4 is journaled in a bushing or bearing 5 within a block 6 secured to the lower portion of the reduced end 2 of the tone arm, and confined thereto preferably by a bottom plate 7. The block 6 is preferably of soft rubber or other resilient material which will not only absorb shock to avoid the transmission thereof to the shaft 4, but may be used to apply friction to this shaft to dampen the action thereof. The inner end of the shaft 4 carries a light shutter or vane 8 fixed thereon. It is preferable that washers 9, which may be felt, surround the shaft or torque wire 4 at the opposite ends of the block 6 to prevent dust from getting into the bearing for the torque wire.

The reduced end 2 of the tone arm is shown as provided with a lining 10, preferably of soft yieldable material such as soft rubber and extending approximately throughout the length of this reduced end. Mounted in the lining 10, is a source of illumination 11, such as an incandescent electric bulb arranged to project light toward the inner end of the tone arm. The tone arm may be provided, if desired, with one or more lenses designated 12 in the path of illumination from the lamp 11.

The inner end of the part 2 of the tone arm is shown as open, as indicated at 13, to permit the light to pass therethrough and to be directed onto a light responsive device generally designated at 14. In the form indicated, this light responsive device is constructed in the form of a photo-electric cell having the usual cathode 15 and anode 16, the cathode being in position to receive light from the lamp 11, as directed through the opening 13, except when the beam of light is intercepted by the vane or shutter 8.

It will be evident that the photo-electric cell 14 will be connected in the usual manner with the sound reproducing apparatus, so as to control the operation thereof in response to the amount of light and the variations in the light beam directed to the cell. Such controls are well-known in the art and need not be illustrated in detail.

The electrical connections both with the lamp 11 and with the cell 14 may extend along or through the tone arm in the usual manner or as found most practical in service.

The operation of this pick-up device will be evident from the foregoing description. The stylus 3 will engage in the record groove and be vibrated thereby back and forth laterally, to transmit through the torque wire or shaft 4 the effect of such vibrations on the shutter or vane 8. The latter in turn will vary in proportion the light directed from the lamp 11 onto the cathode of the photo-electric cell by intercepting the beam of light directed through the opening 13. It is preferable that the vane 8 be disposed normally in the edge of the beam of light to produce the greatest volume, where it will move into or out of the beam to vary the reproducing effects in response to variations in the sound groove of the record disc.

With this arrangement, it is not required that any aperture or slot be provided through which the light beam is directed, but it has been found that effective tone quality may be obtained by the arrangement set forth without the complexity and expense incidental to the use of such a slot or opening. Therefore, the device is not critical of adjustment and is much less expensive to manufacture because of the simplicity of construction as described. At the same time the stylus can be moved through a large latitude and yet will play with good results.

In the form of invention shown in Fig. 2, the size of the end portion of the tone arm in which the control device is mounted, may be reduced appreciably, and the construction further simplified by the elimination of the lenses 12. In this form, the tone arm 21 has an end portion 22 in which a lamp 23 is mounted, so as to direct its beam of light inwardly along the tone arm. A light opening 24 of somewhat constricted size may be used, if desired, between the lamp 23 and the photo-electric cell 24.

The vane or shutter 25 is in position to intercept this beam of light and is carried by one end of a torque wire or shaft 26, the opposite end of which carries the stylus 27. These parts are substantially of the construction and operation described above in connection with Fig. 1. The manner of operation thereof, is likewise similar to that of Fig. 1.

In the forms of the invention shown in Figs. 3, 4 and 5, the light responsive cell and also the source of illumination are constructed in a single unit, such as a lamp envelope, adapted to be mounted in a convenient position on the tone arm or other part of a phonograph. The construction provides for the interception of the beam from the source of illumination to the lamp by a vane connected with a stylus and without the necessity for providing any special form of slot or aperture such as has been required heretofore.

In the form shown in Fig. 3, the envelope 31 has a re-entrant portion in one end thereof, forming a recess into which projects a light vane or shutter 32 attached to a stylus 34. The stylus may be mounted on a pivot 35 on the tone arm or other portion of the sound reproducer so as to swing the vane 32 back and forth in response to variations in the sound groove of the record disc.

Mounted on one side of the recess is a source of illumination, such as an incandescent filament 36. On the opposite side thereof is a light responsive device illustrated as a photo-electric cathode 37, having an anode 38, associated therewith. It will be evident that the beam of light from the filament 36 to the cathode 37 will be intercepted by the vane 33 moved in response to variations in the sound groove of the record disc, to vary the action of the photo-electric device and thereby control the operation of the sound reproducing apparatus, accurately to reproduce the sound in accordance with the sound groove.

The device shown in Fig. 4, is of the same character generally as that illustrated in Fig. 3, except that the recess shown at 42, in the lower end of the envelope 41 is of appreciably greater depth and extends throughout the major portion of the length of the envelope. In this form also, the source of illumination and the light responsive device are on opposite sides of this recess in position for the light beam therebetween to be intercepted by the vane 43 which operates in response to the movement of the stylus 44 by the sound groove in the record disc.

In the further modification shown in Fig. 5, the envelope 51 has a partition 52 therein, with a light aperture 53 in the partition through which a beam of light may be directed onto the photo-electric cathode 54 from a filament 55. The latter is attached to one end of a stylus 56 which is pivotally mounted on a glass bead 57 in the center of a metal disc 58, which closes the lower end of the envelope 51. This form operates generally in the manner described in my prior patent, No. 2,320,879, June 1, 1943. Vibrations of the stylus 56 will move the filament 55 to vary the light beam therefrom onto the photo-electric cathode, and thereby control the reproduction of sound in response to the sound groove of the record disc.

In these several forms, I have provided for controlling sound reproduction in a very simple and expeditious manner and without the use of more expensive construction involving a slot or aperture which would also require critical adjustment of the stylus with respect thereto. Furthermore, good quality of sound reproduction is obtained, as I have found by experiments with these several devices. The simplicity of structure and inexpensiveness thereof, while yet obtaining good tone quality, render these devices practical for use over, and much improved, with respect to pick-up devices generally in commercial use.

It is also possible, according to this invention, to increase the output from the cell and obtain more amplification from the reproducer amplifier. Thus, if the light source, such as the lamp 11, is modulated at some frequency in the supersonic range, as, for instance, at 20,000 cycles, the amplifier can be designed to amplify this with a considerable gain. The audio frequency of the stylus then modulates the beam, and by means of a detector, the sounds are made audible with a great deal more gain in amplification. Thus, the lamp can be lighted from an oscillator to improve the result of amplification produced, according to this invention.

While I have illustrated and described the invention in certain embodiments thereof, it is recognized that variations and changes may be made in the construction without departing from the invention, except as specified in the claims.

I claim:

1. A phonograph pick-up device comprising light responsive means, means for directing a beam of light onto the light responsive means, a vane arranged to intercept the beam of light, a shaft supporting the vane, a stylus mounted on the shaft and spaced on said shaft from said vane and adapted to be actuated by a sound record for moving the vane and varying the light on the light responsive means, a unitary housing enclosing the light responsive means, the means for directing a beam of light onto the light responsive means, the vane and a portion of the shaft, said housing having an opening therein, and a resilient bearing mounted in the opening in said housing supporting the shaft, said bearing being disposed between the vane and the stylus.

2. A phonograph pick-up device comprising a photo-electric cell, a lamp spaced from the cell in position to direct a beam of light thereon, a vane in position to intercept the light from the lamp to the cell, a shaft supporting the vane thereon, yieldable means supporting the shaft and journaling the shaft for turning movement, a unitary housing enclosing said cell, lamp, vane and a portion of said shaft, said housing having an opening therein, and a stylus mounted on the shaft and spaced on said shaft from said vane and adapted to be actuated by a sound record, and a resilient bearing mounted in the opening in said housing supporting the shaft, said bearing being disposed between the vane and stylus to prevent light from the lamp reaching the stylus.

3. A phonograph pick-up device comprising a tone arm, a photo-electric cell mounted on the tone arm, an incandescent lamp mounted on the tone arm in position to direct a beam of light therefrom to the cell, a vane interposed between the cell and lamp in position to vary said beam of light, a shaft supporting said vane, said vane being mounted adjacent one end of said shaft, a yieldable member journaling the shaft for turning movement, a stylus adapted to be actuated by a sound record and mounted on the opposite end of the shaft for actuating the vane to vary the light on the cell, a unitary housing enclosing said cell, lamp, vane and a portion of said shaft, said housing having an opening therein and a resilient bearing mounted in said opening on the shaft between the stylus and the vane to prevent light from the incandescent lamp reaching the stylus.

4. A phonograph pick-up device comprising a light-sensitive cell, means for directing a beam of light onto the cell, a vane in position to intercept the light from said means to the cell, a shaft supporting the vane on one end portion thereof, a stylus mounted on the shaft and adapted to be actuated by a sound record for operating the vane, a unitary housing enclosing said cell, said means for directing a beam of light on the cell and said vane, said housing having an opening therein and yieldable means mounted in the opening disposed between the stylus and the vane to prevent light from outside the housing reaching said light sensitive cell.

5. A phonograph pick-up device comprising a light-sensitive cell, means for directing a beam of light onto the cell, a vane in position to intercept the light from said means to the cell, a shaft supporting the vane on one end portion thereof, a stylus mounted on the opposite end portion of the shaft and adapted to be actuated by a sound record for operating the vane, a bearing for the shaft, a unitary housing enclosing said cell, said means for directing a beam of light on the cell and said vane, said housing having an opening therein, and a block of resilient material mounted in the opening in said housing supporting said shaft and bearing, said resilient material and bearing being positioned to prevent light from within the housing reaching the stylus.

6. A phonograph pick-up device comprising a light-sensitive cell, means for directing a beam of light onto the cell, a vane in position to intercept the light from said means to the cell, a shaft supporting the vane on one end portion thereof, a stylus mounted on the opposite end portion of the shaft and adapted to be actuated by a sound record for operating the vane, a bearing for the shaft, a block of resilient material supporting said shaft and bearing, and a unitary housing enclosing the cell, light means, vane and at least a portion of said shaft and having the shaft projecting to an end of the housing with the stylus externally of the housing.

ORAN T. McILVAINE.

REFERENCES CITED

The following references are of record in the file of this patent:

UNITED STATES PATENTS

| Number | Name | Date |
|---|---|---|
| 1,905,669 | Yenzer | Apr. 25, 1933 |
| 2,088,960 | Johnson | Aug. 3, 1937 |
| 2,320,879 | McIlvaine | June 1, 1943 |
| 2,348,660 | Stephan | May 9, 1944 |
| 2,359,808 | Thompson | Oct. 10, 1944 |
| 2,441,464 | Albright | May 11, 1948 |

FOREIGN PATENTS

| Number | Country | Date |
|---|---|---|
| 679,100 | France | Jan. 5, 1930 |